(12) United States Patent
Heer et al.

(10) Patent No.: US 12,381,436 B2
(45) Date of Patent: Aug. 5, 2025

(54) ELECTRIC MOTOR HAVING AN INTERCONNECTION UNIT AND METHOD FOR MANUFACTURING AN ELECTRIC MOTOR HAVING AN INTERCONNECTION UNIT

(71) Applicant: SEW-EURODRIVE GMBH & CO. KG, Bruchsal (DE)

(72) Inventors: Markus Heer, Maulburg (DE); Domenik Hettel, Au am Rhein (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 598 days.

(21) Appl. No.: 17/261,378

(22) PCT Filed: Jul. 4, 2019

(86) PCT No.: PCT/EP2019/025213
§ 371 (c)(1),
(2) Date: Jan. 19, 2021

(87) PCT Pub. No.: WO2020/015855
PCT Pub. Date: Jan. 23, 2020

(65) Prior Publication Data
US 2021/0281138 A1 Sep. 9, 2021

(30) Foreign Application Priority Data
Jul. 19, 2018 (DE) .......................... 102018005671.7

(51) Int. Cl.
*H02K 3/28* (2006.01)
*H02K 3/52* (2006.01)
(Continued)

(52) U.S. Cl.
CPC ............. *H02K 3/522* (2013.01); *H02K 15/32* (2025.01); *H02K 21/16* (2013.01); *H02K 2203/09* (2013.01)

(58) Field of Classification Search
CPC .. H02K 3/00; H02K 3/12; H02K 3/28; H02K 3/34; H02K 3/38; H02K 3/50;
(Continued)

(56) References Cited

U.S. PATENT DOCUMENTS 6,914,356 B2   7/2005  Yamamura et al.
7,262,529 B2   8/2007  Klappenbach
(Continued)

FOREIGN PATENT DOCUMENTS

CN    1720653 A    1/2006
CN    102545448 A  7/2012
(Continued)

OTHER PUBLICATIONS

International Search Report issued in corresponding International Application No. PCT/EP2019/025213, dated Sep. 23, 2019, pp. 1-3, English Translation.
(Continued)

*Primary Examiner* — Tran N Nguyen
(74) *Attorney, Agent, or Firm* — Carter, DeLuca & Farrell LLP

(57) ABSTRACT

An electric motor includes a rotor and a stator having a plurality of coils; each coil having two coil terminals; the coils being interconnected with the aid of an interconnection unit including a carrier part for holding a plurality of interconnection elements set apart from each other; each of the interconnection elements having two contacting regions set apart from each other and a connecting region joined to the contacting regions; the contacting regions of the interconnection elements being connected to one of the coil
(Continued)

terminals at a connecting point; the region covered by the connecting region of one of the interconnection elements in the circumferential and radial directions overlapping a region covered by the connecting region of another interconnection element in the circumferential and radial directions; the first interconnection elements being manufactured identically.

32 Claims, 11 Drawing Sheets

(51) Int. Cl.
*H02K 15/32* (2025.01)
*H02K 21/16* (2006.01)

(58) Field of Classification Search
CPC .......... H02K 3/505; H02K 3/52; H02K 3/522; H02K 5/00; H02K 5/22; H02K 5/225
See application file for complete search history.

(56) References Cited

U.S. PATENT DOCUMENTS

| | | | |
|---|---|---|---|
| 8,816,550 B2 | 8/2014 | Kim | |
| 8,922,080 B2 * | 12/2014 | Nakagawa | H01R 43/16 310/71 |
| 9,318,929 B2 | 4/2016 | Schäflein | |
| 9,601,958 B2 | 3/2017 | Yamaguchi et al. | |
| 9,608,488 B2 | 3/2017 | Koch et al. | |
| 10,050,483 B2 | 8/2018 | Sambuichi | |
| 10,243,418 B2 | 3/2019 | Nakamura | |
| 10,256,694 B2 | 4/2019 | Fukunaga | |
| 10,424,983 B2 | 9/2019 | Takasaki | |
| 10,686,344 B2 | 6/2020 | Csoti et al. | |
| 10,892,663 B2 | 1/2021 | Kong | |
| 2005/0189833 A1 | 9/2005 | Gordon | |
| 2008/0136274 A1 | 6/2008 | Yoshi | |
| 2009/0140595 A1 * | 6/2009 | Naganawa | H02K 3/522 310/201 |
| 2012/0228972 A1 | 9/2012 | Moya | |
| 2013/0200743 A1 * | 8/2013 | Okimitsu | H02K 3/12 310/201 |
| 2013/0257185 A1 * | 10/2013 | Akutsu | H02K 5/02 310/43 |
| 2013/0263439 A1 | 10/2013 | Brandau | |
| 2014/0015349 A1 * | 1/2014 | Chamberlin | H02K 3/345 310/43 |
| 2014/0117804 A1 | 5/2014 | Nestler | |
| 2016/0036187 A1 | 2/2016 | Houzumi | |
| 2018/0316238 A1 * | 11/2018 | Kong | B62D 5/0403 |
| 2021/0273516 A1 | 9/2021 | Heer | |

FOREIGN PATENT DOCUMENTS

| | | | |
|---|---|---|---|
| CN | 102648572 A | 8/2012 | |
| CN | 102820724 A | 12/2012 | |
| CN | 205355995 U | 6/2016 | |
| CN | 106972669 A | 7/2017 | |
| CN | 107154696 A | 9/2017 | |
| DE | 10301441 A1 | 11/2003 | |
| DE | 10328720 A1 | 1/2005 | |
| DE | 102006043194 A1 * | 10/2007 | ............ H02K 11/33 |
| DE | 102012202131 A1 | 8/2013 | |
| DE | 102012020329 A1 | 4/2014 | |
| DE | 102012024581 A1 | 6/2014 | |
| DE | 102013105571 A1 | 12/2014 | |
| DE | 102014201637 A1 | 7/2015 | |
| DE | 112013005061 T5 | 7/2015 | |
| DE | 102015200093 A1 * | 7/2016 | ............ H02K 3/522 |
| DE | 112012003994 B4 | 8/2017 | |
| DE | 102016204935 A1 | 9/2017 | |
| EP | 2752973 A1 | 7/2014 | |
| EP | 2765687 A2 | 8/2014 | |
| JP | H06-233483 A | 8/1994 | |
| JP | 2009-290922 A | 12/2009 | |
| JP | 5954423 B2 | 7/2016 | |
| WO | WO2017013773 A1 * | 1/2017 | ............ H02K 3/50 |
| WO | WO2017078455 A1 * | 5/2017 | ............ H02K 5/22 |
| WO | 2017162568 A1 | 9/2017 | |

OTHER PUBLICATIONS

International Search Report issued in corresponding International Application No. PCT/EP2019/025214, dated Sep. 30, 2019, pp. 1-2, English Translation.

* cited by examiner

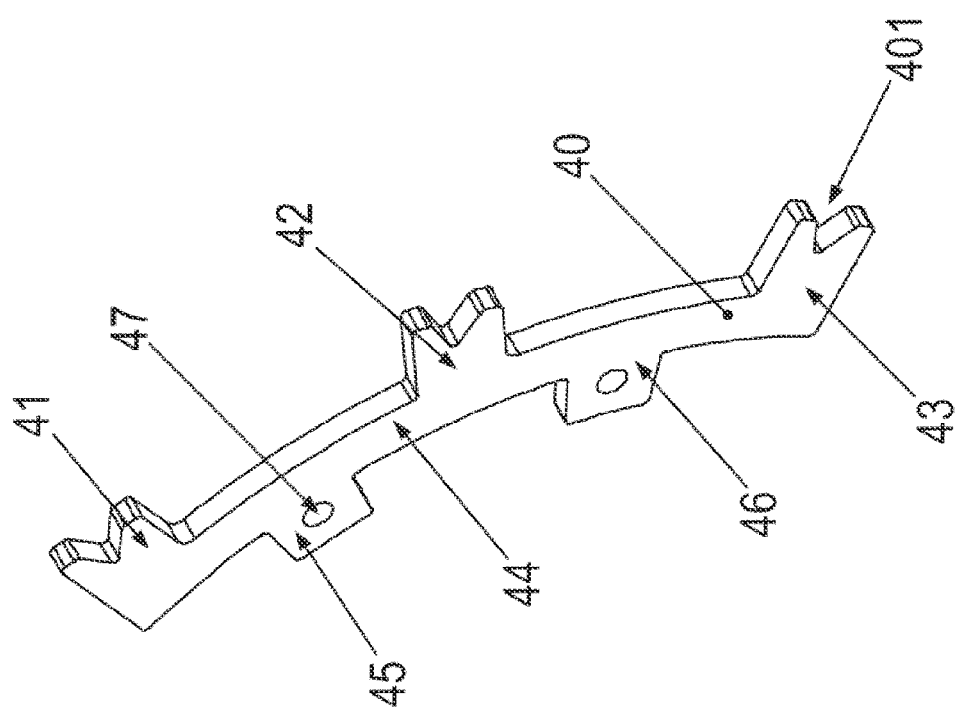

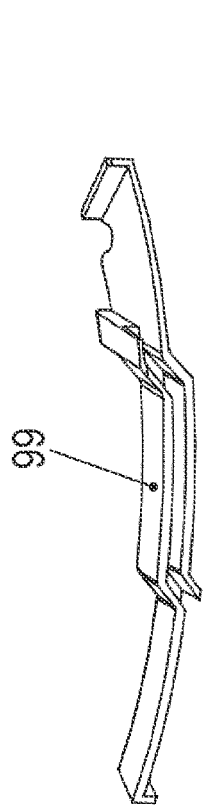
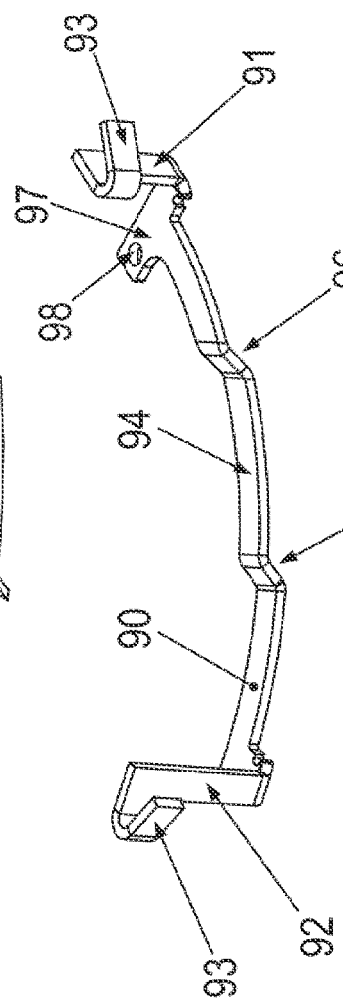
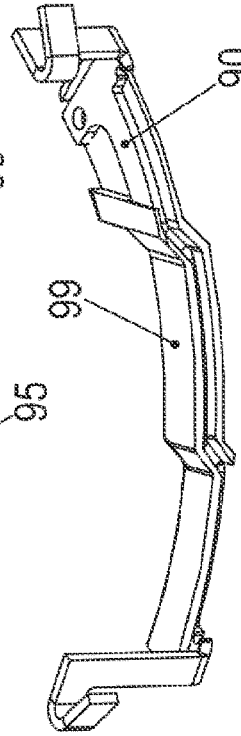
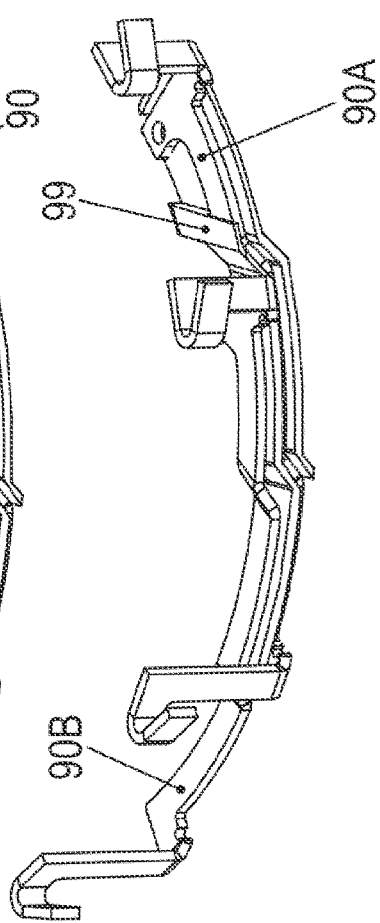

ELECTRIC MOTOR HAVING AN INTERCONNECTION UNIT AND METHOD FOR MANUFACTURING AN ELECTRIC MOTOR HAVING AN INTERCONNECTION UNIT

FIELD OF THE INVENTION

The present invention relates to an electric motor having an interconnection unit and a method for its manufacture.

BACKGROUND INFORMATION

Certain conventional electric motors include a stator, on which a multiphase winding is situated. In this context, the winding is made up of, for example, a plurality of interconnected coils. In addition, certain conventional stators are conventional, which are made up of wound, individual teeth, where, therefore, each stator tooth holds an individual tooth winding. In this context, each individual tooth winding forms a coil, which is made up of winding wire. The free ends of a winding wire form the two coil terminals of a coil, which must normally be interconnected at one or both axial ends of the stator, in order to form the multiphase winding. In this context, a star connection and delta connection are conventional.

Example embodiments of the present invention are particularly suited for synchronous motors, whose stators are made up of individual stator tooth segments; each stator tooth segment including, in each instance, a coil, that is, an individual tooth winding. These synchronous motors include, in particular, a three-phase winding having the phases U, V and W; each phase, for example, being assigned a coil group. A coil group includes, in turn, a plurality of individual coils; these coils being interconnected electrically with the aid of the interconnection unit described herein. Thus, a coil terminal of a coil is contacted with another coil terminal of another coil with the aid of an interconnection element of the interconnection unit. The coil groups connected in this manner are, for example, interconnected, using a star connection.

Different types of interconnection of coil terminals are conventional.

A stator unit and a motor are described in German Patent Document No. 11 2013 005 061, a collector rail unit being situated on an upper side of the stator.

An electric motor having an interconnection ring, in which wire segments are inserted into radially spaced grooves running concentrically, is described in German Patent Document No. 10 2012 024 581.

An electric motor having an interconnection ring, in which electrical lines, in particular, ones manufactured as stamped and bent parts, are inserted into radially spaced grooves extending concentrically, is described in German Patent Document No. 10 2012 020 329.

An electrical machine, which has an annular carrier and circuit traces situated in the carrier for connecting coils and phase windings, is described in German Patent Document No. 103 28 720. In this context, the circuit traces are staggered radially edgewise, one behind the other, and inserted into the carrier, offset from one another in the circumferential direction.

An electric motor having a carrier part, in which the ends of windings are interconnected with the aid of multisectional current rails, is described in German Patent Document No. 10 2014 201 637.

An electric motor having an interconnection ring, in which circular current rails are positioned in two annular grooves of the interconnection ring, is described in European Patent Document No. 2 752 973.

An electrical machine having an interconnection plate, in which conductor elements for interconnecting the windings are used, is described in German Patent Document No. 2016 204 935, the conductor elements having a plastic extrusion coating for insulation.

An interconnection plate of a stator of an electrical machine is described in German Patent Document No. 10 2015 200 093, the interconnection plate including conductor elements, which are connectible to the electrical winding.

SUMMARY

Example embodiments of the present invention provide an electric motor having an interconnection unit and a method for manufacturing it, in which the production expenditure during manufacturing is reduced and the electric motor may be manufactured more simply, cost-effectively and ruggedly.

In the case of the electric motor, in particular, permanent-magnet synchronous motor, which has a rotor mounted so as to be rotatable about an axis of rotation, as well as a stator, the stator includes a plurality of coils; each coil having two coil terminals; in particular, the stator including a plurality of stator segments, and each stator segment having exactly one coil; the coils being interconnected with the aid of an interconnection unit, in particular, by a star connection; the interconnection unit including a carrier part, in particular, a substantially annular carrier part, in particular, a carrier part made of an insulating material, for holding a plurality of, in particular, at least four, interconnection elements set apart from each other; in particular, the interconnection unit being positioned at an axial end of the stator, in particular, concentrically to the axis of rotation; in particular, at least three first interconnection elements being provided; each of the first interconnection elements having, in each instance, two, in particular, exactly two, contacting regions set apart from each other and a connecting region joined to the contacting regions, in particular, in such a manner, that the connecting region is situated between the contacting regions; the, in particular, all, contacting regions of each first interconnection element being connected, in each instance, to one of the coil terminals at, in each instance, a connecting point, in particular, electrically connected, in particular, integrally connected with the aid of laser welding; the region covered by the connecting region of one of the first interconnection elements in the circumferential and radial directions overlapping, in each instance, a region covered by the connecting region of another of the first interconnection elements in the circumferential and radial directions.

The terms "circumferential direction," "radial direction," and "axial direction" relate to directions relative to the axis of rotation of the rotor. Thus, the axial direction refers to the direction parallel to the axis of rotation, while the radial direction refers to the directions perpendicular to the axis of rotation and radially outwards from the axis of rotation and/or radially inwards towards the axis of rotation. The circumferential direction is to be understood as the direction, which extends along the circumference of a closed curve, in particular, a circle, extending perpendicularly and, in particular, concentrically, to the axis of rotation. Thus, the term is not limited to circular circumferences, but is also applicable to, for example, elliptical or polygonal peripheries.

The term "substantially annular carrier part" is to be understood to mean that the carrier part is disk-shaped, that is, has a through-opening in the middle, and that the dimension in the axial direction is less than the diameter of the carrier part in the plane perpendicular to the axis of rotation. In this context, the exact shape of the outer and inner contours is not necessarily circular, as in the case of a ring. Other shapes, such as polygonal shapes, are also possible. It is also possible for the shape to deviate from the ideal circular shape, in that, for example, recesses are present on the outer circumference or on the inner circumference.

Plastic is, for example, used as insulating material for the carrier part. In particular, the carrier part is produced with the aid of a plastic injection molding method. However, other materials, which have electrical insulating properties, that is, are insulating materials, may also be used.

The carrier part holds the interconnection elements, that is, provides for the spatial positioning of the interconnection elements with respect to each other. The interconnection elements are spaced apart from each other. Thus, they do not touch each other and are, therefore, not in direct contact with each other.

Instead of laser welding, hard-soldering, ultrasonic welding or resistance welding are also possible.

The interconnection elements are made of an electrically conductive material, for example, of metal or sheet metal and, in particular, of copper sheet. The interconnection elements are, for example, of one piece and/or manufactured as stamped and bent parts. The manufacturing may be carried out with the aid of water jet cutting or laser cutting.

A "connecting point" is understood to be the location, at which an electrical connection between an interconnection element and a coil terminal is present.

A "region" is to be understood as a particular part of a component, which satisfies a particular function. For example, the connecting region of the first interconnection element joins the two contacting regions. The contacting regions are used, in turn, for contacting the interconnection elements with the coil terminals. If a component is manufactured in one piece, then exact delimitation between the regions is not always able to be defined precisely. The region of a component is not to be confused with a "region" of a component "covered" in one direction.

Each first interconnection element accommodated on the carrier part is positioned over or under at least one other first interconnection element in the axial direction. Thus, the first interconnection elements are stacked partially one on top of the other in the axial direction, but without touching each other. In this context, the region of a connecting region covered in the circumferential and radial directions is the surface, which results from projecting the corresponding connecting region parallelly to the axial direction onto a projection plane perpendicular to the axis of rotation. Thus, the thereby formed projection surfaces of the connecting regions of, in each instance, two first interconnection elements overlap in the projection plane.

In this context, a compact design of the interconnection unit is obtainable.

According to example embodiments of the present invention, the first interconnection elements are manufactured identically.

In this instance, it is considered advantageous that fewer different kinds of interconnection elements have to be manufactured, and thus, the manufacturing expenditure is reduced. The interconnection unit may be manufactured, using one type of first interconnection elements. This facilitates, in particular, the automated production of the first interconnection elements, for example, when these are fabricated mechanically as stamped and bent parts.

According to example embodiments, the regions covered by the connecting regions of the first interconnection elements in the axial direction are identical. In this context, it is considered advantageous that space may be saved in the axial direction, which means that a compact type of construction of the interconnection unit in the axial direction may be achieved.

According to example embodiments, the regions covered by the connecting regions of the first interconnection elements in the radial direction are identical.

In this context, it is considered advantageous that space may be saved in the radial direction, which means that a compact type of construction of the interconnection unit in the radial direction may be achieved.

According to example embodiments, the contacting regions of each first interconnection element are shaped in such a manner, that the respective connecting points have, in each instance, substantially the same radial position, in particular, at the outer circumference of the carrier part, and/or have, in each instance, the same axial position. In this context, it is considered advantageous that the contacting of the contacting regions with the coil terminals may be implemented in a simple manner. This renders automated assembly possible. The connecting points are, for example, situated at the outer circumference of the carrier part, which means that there is easy accessibility.

According to example embodiments, the connecting region of each of the first interconnection elements has, in particular, an approximately rectangular cross section, whose dimension in the axial direction is less than its dimension in the radial direction. In this connection, it is considered advantageous that space may be saved in the axial direction.

According to example embodiments, at least one connecting region of one of the first interconnection elements has two axial steps; in particular, all of the connecting regions of the first interconnection elements having two axial steps each.

In this context, it is considered advantageous that partial stacking of the first interconnection elements on top of each other is simplified. Instead of discrete steps in the connecting region, a, in particular, constant slope of the connecting region extending in the axial direction is also possible, so that the two contacting regions have different axial positions and partial stacking on top of each other is rendered possible.

According to example embodiments, each of the first interconnection elements has, in each instance, a first attachment region for form-locked and/or integral connection to the carrier part; in particular, each of the first attachment regions having, in each instance, a first through-recess in the axial direction, and the carrier part having a plurality of rivet pins extending in the axial direction; in particular, in each instance, a first rivet pin being able to be passed through each of the first recesses; in particular, the free ends of the first rivet pins being deformed into rivet heads, in particular, with the aid of ultrasonic welding.

In this context, it is considered advantageous that a reliable and sturdy, in particular, undetachable connection of the interconnection elements to the carrier part is obtainable, so that there is protection from loss. As an alternative to ultrasonic welding, hot crimping or hot stamping is also possible.

The recess may be produced, for example, as a, in particular, cylindrical hole. A hole is an example of a closed recess. However, open recesses, which do not form a closed curve in the plane perpendicular to the axis of rotation, are also possible. For example, a notch in the axial direction constitutes a recess, as well. It is only important that the recess extends through in the axial direction and is suitable for a form-locked and/or integral connection to the carrier part.

A rivet pin is to be understood as a projection in the axial direction, which is shaped in such a manner, that it may be passed through the recesses of the first interconnection elements in the axial direction. In the illustrative case of a cylindrical hole as a recess, the rivet pin is constructed as a cylindrical projection in the axial direction. The form-locked and/or integral connection is produced by deforming the free end of the rivet pin into a rivet head. For example, mushroom-shaped rivet heads or disk-shaped rivet heads are suitable for attaining a form-locked connection. The diameter of the rivet head in the plane perpendicular to the axis of rotation is selected to be greater than the diameter of the corresponding recess in the same plane.

According to example embodiments, each of the first interconnection elements has, in each instance, a second attachment region for form-locked and/or integral connection to the carrier part; in particular, each of the second attachment regions having, in each instance, a second through-recess in the axial direction; in each instance, a second rivet pin being able to be passed through each of the second recesses; the free ends of the second rivet pins being able to be deformed into rivet heads, in particular, with the aid of ultrasonic welding.

In this context, it is considered advantageous that more effective and sturdier spatial fixing of the first interconnection elements in position on the carrier part is attainable, so that movement of the interconnection elements relative to the carrier part is prevented.

According to example embodiments, the first attachment regions of each of the first interconnection elements each have the same first radial position and/or each have the same first axial position, and/or the second attachment regions of each of the first interconnection elements each have the same second radial position and/or each have the same second axial position; in particular, the first radial position and the second radial position being different; in particular, the first axial position and the second axial position being different. In this context, it is considered advantageous that the spatial fixing of the first interconnection elements in position on the carrier part is improved further. Tilting of the interconnection elements relative to the carrier part is prevented.

According to example embodiments, the region covered by one of the first interconnection elements in the circumferential and radial directions overlaps, in each instance, two regions covered by, in each instance, two other first interconnection elements in the circumferential and radial directions. In this context, it is considered advantageous that a more compact configuration of the interconnection unit is achievable. The wording is to be understood to mean that in certain circumferential and radial regions, three first interconnection elements are positioned axially one on top of the other.

According to example embodiments, a second interconnection element is provided, which has three, in particular, exactly three contacting regions; each of the three contacting regions of the second interconnection element being connected, in each instance, to one of the coil terminals, in particular, electrically connected, in particular, integrally connected with the aid of laser welding. In this context, it is considered advantageous that interconnection of the coils by a star connection is provided. In this instance, the second interconnection element is used as a star connection element for connecting three different coil terminals. The second interconnection element may be omitted for interconnection via a delta connection.

According to example embodiments, the second interconnection element has two, in particular, exactly two attachment regions for form-locked and/or integral connection to the carrier part; in particular, each attachment region having, in each instance, a through-recess in the axial direction; and in each instance, a third rivet pin being able to be passed through each of the recesses; in particular, the free ends of the third rivet pins being able to be deformed into rivet heads, in particular, with the aid of ultrasonic welding.

In this context, it is considered advantageous that more effective and sturdier spatial fixing of the second interconnection element in position on the carrier part is attainable, so that movement of the interconnection element relative to the carrier part is prevented.

According to example embodiments, the region covered by the second interconnection element in the radial direction and the region covered by at least one of the first interconnection elements, in particular, the region covered by all of the first interconnection elements, in the radial direction, are identical. In this context, it is considered advantageous that space may be saved in the radial direction, which means that a compact type of construction of the interconnection unit in the radial direction may be achieved.

According to example embodiments, the region covered by the second interconnection element in the circumferential and radial directions and the region covered by at least one of the first interconnection elements, in particular, the region covered by two of the first interconnection elements, in the circumferential and radial directions, overlap. In this context, it is considered advantageous that a compact configuration of the interconnection unit is attainable.

According to example embodiments, a plurality of, in particular, exactly three, third interconnection elements are provided, which each have a first contacting region and a second contacting region that are constructed differently; in each instance, the first contacting region of a third interconnection element being connected, in each instance, to one of the coil terminals, in particular, electrically connected, in particular, integrally connected with the aid of laser welding. In this context, it is considered advantageous that simple connection of the, in particular, three, phase conductors to the electric motor is provided. The third interconnection elements are electrically connected, using the first contacting region, to the coils, which are each intended to be connected to one phase. The second contacting region is then suitable for connection of the third interconnection elements to the phase conductors, in order to establish, in this manner, an electrical connection between the phase conductor and the coil. The connection is made, for example, by attaching cable lugs of the phase conductors to the second attachment region, using a screw and a nut.

According to example embodiments, each of the third interconnection elements has a first and a second attachment region for form-locked and/or integral connection to the carrier part; in particular, each of the two attachment regions having, in each instance, a through-recess in the axial direction; and in each instance, a fourth rivet pin being able to be passed through each of the recesses; in particular, the free ends of the fourth rivet pins being deformed into rivet heads, in particular, with the aid of ultrasonic welding.

In this context, it is considered advantageous that more effective and sturdier spatial fixing of the third interconnection elements in position on the carrier part is attainable, so that movement of the interconnection elements relative to the carrier part is prevented.

According to example embodiments, each of the third interconnection elements has a third attachment region for form-locked and/or integral connection to the carrier part; the third attachment region bordering on the first contacting region of the respective, third interconnection element; in particular, the third attachment region having a through-recess in the axial direction, through which, in each instance, a fifth rivet pin may be passed; in particular, the free ends of the fifth rivet pins being deformed into rivet heads, in particular, with the aid of ultrasonic welding. In this context, it is considered advantageous that the spatial fixing of the third interconnection elements in position on the carrier part is improved further.

According to example embodiments, the third interconnection elements are manufactured to be identical. In this instance, it is considered advantageous that fewer different kinds of interconnection elements must be manufactured, and thus, the manufacturing expenditure is reduced. The interconnection unit may be manufactured, using one type of third interconnection elements.

According to example embodiments, the carrier part includes a plurality of guide regions at its outer circumference, for guiding the coil terminals in the axial direction; each contacting region connected to a coil terminal being assigned, in each instance, a guide region; in particular, the shape of the guide region being substantially identical to the shape of the respectively assigned contacting region.

In this context, it is considered advantageous that in the method for manufacturing the electric motor, the step of contacting the coil terminals with the interconnection unit may be carried out more reliably. The guidance of the coil terminals ensures that the coil terminals are oriented substantially parallelly to the axis of rotation. The coil terminals may, for example, be clamped to the guide regions and, in this manner, facilitate the method step of producing an integral connection between the contacting region and the coil terminal. This renders automated manufacturing attainable.

According to example embodiments, at least one of the first interconnection elements is surrounded in such a manner by an insulating part made of insulating material, in particular, with the aid of an injection molding method, that the surrounded, first interconnection element and the surrounding insulating part are joined on two sides in a form-locked manner in the circumferential direction and/or joined on two sides in a form-locked manner in the axial direction and/or joined on one side in a form-locked manner in the radial direction; in particular, in the circumferential direction, only every second of the first interconnection elements being surrounded by a respective insulating part in such a manner. In this context, it is considered advantageous that sufficient electrical insulation of the first interconnection elements among themselves is easily attainable. With the aid of prefabricated insulating parts, shorter distances between the first interconnection elements are feasible, while simultaneously ensuring suitable leakage paths for sufficient electrical insulation. As an alternative, subsequent extrusion-coating of the first interconnection elements with an insulating material may be carried out. However, this method is more difficult to implement and is more expensive.

According to example embodiments, the coil terminals are integrally connected by laser welding to the contacting regions of the first interconnection elements and/or to the contacting regions of the second interconnection elements and/or to, in each instance, a contacting region of the third interconnection elements; in particular, the contacting regions to be connected having a V-shaped notch for receiving a coil terminal in the form of a winding wire; in particular, the V-shaped notch including a segment of a circular arc; in particular, the radius of the segment of the circular arc being, at most, as large as the radius of the winding wire.

In this context, it is considered advantageous that with the aid of laser welding, the contacting may be carried out so rapidly, that no significant heating of the first interconnection elements occurs. Because of this, the welds may be close to parts made of insulating material, in particular, plastic, without damaging and/or deforming them due to heating. In this manner, it is possible, in particular, to position a contacting region spatially close, that is, adjacent, to an attachment region, which results in a more compact configuration. The V-shaped notch has the advantage that a secure and reliable electrical connection may always be established for different diameters of winding wires. The wire always lies symmetrically to the axis of symmetry of the notch and therefore touches the contacting region at at least two points. Thus, one type of contacting region may be used for different wire diameters.

In the method for manufacturing an electric motor, the, in particular, sequential, steps may be performed: i) providing an, in particular, substantially annular carrier part made of an insulating material; in particular, the carrier part being manufactured with the aid of an injecting molding method; ii) positioning a plurality of, in particular, identical, first interconnection elements on the carrier part in the circumferential direction; each of the first interconnection elements having two, in particular, exactly two, contacting regions, and the first interconnection elements being positioned in such a manner, that in each instance, the region covered by one of the first interconnection elements in the circumferential and radial directions overlaps a region covered by an adjacent, first interconnection element in the circumferential and radial directions; the first interconnection elements being positioned so as to be spaced apart from each other; iii) joining the first interconnection elements to the carrier part, in particular, in a form-locked and/or integral manner, to form an interconnection unit; iv) connecting, in particular, electrically connecting each of the contacting regions of the first interconnection elements, in particular, in an integral manner with the aid of laser welding, to, in each instance, a coil terminal of one of a plurality of coils, which each have two coil terminals and are positioned on a stator of the electric motor, in order to interconnect the coils to form a multiphase winding.

In this context, it is considered advantageous that a compact configuration of the interconnection unit is attainable.

According to example embodiments, in particular, in step ii), the first interconnection elements are positioned in such a manner, that in the circumferential direction, only every second of the first interconnection elements is surrounded by an insulating part made of an insulating material; the insulating part being manufactured, in particular, with the aid of an injection molding method; the surrounded, first interconnection element and the surrounding insulating part being joined on two sides in the circumferential direction in a form-locked manner and/or joined on two sides in the axial direction in a form-locked manner and/or joined on one side in the radial direction in a form-locked manner. In this context, it is considered advantageous that sufficient electrical insulation of the first interconnection elements among themselves is easily attainable. With the aid of prefabricated insulating parts, shorter distances between the first interconnection elements are possible, while simultaneously ensuring suitable leakage paths for sufficient electrical insulation. As an alternative, subsequent extrusion-coating of the first interconnection elements with an insulating material may be carried out. However, this method is more difficult to implement and is more expensive.

According to example embodiments, in particular, in step ii), a second interconnection element is situated on the carrier part; the second interconnection element having three, in particular, exactly three, contacting regions; in particular, in step iii), the second interconnection element being joined to the carrier part, in particular, in a form-locked and/or integral manner; in particular, in step iv), each of the contacting regions of the second interconnection element being connected, in each instance, to one of the coil terminals, in particular, electrically connected, in particular, integrally connected with the aid of laser welding. In this context, it is considered advantageous that interconnection of the coils by a star connection is enabled. In this instance, the second interconnection element is used as a star connection element for connecting three different coil terminals.

According to example embodiments, in particular, in step ii), three third interconnection elements are positioned on the carrier part; the three interconnection elements each having two, in particular, different kinds of contacting regions; in particular, in step iii), the third interconnection elements being joined to the carrier part, in particular, in a form-locked and/or integral manner, to form the interconnection unit; in particular, in step iv), in each instance, one of the two contacting regions of the third interconnection elements being connected, in each instance, to one of the coil terminals, in particular, electrically connected, in particular, integrally connected with the aid of laser welding. In this context, it is considered advantageous that simple connection of the, in particular, three, phase conductors to the electric motor is enabled. Using one of their contacting regions, the third interconnection elements are connected to the coils, which are each intended to be connected to one phase. The connection of these coils to the phase conductors is then accomplished in a simple manner, for example, using cable lugs.

According to example embodiments, in particular, according to step iv), the stator, including the coils, as well as the interconnection unit connected to the coil terminals, are encapsulated by potting compound, in particular, in such a manner, that in each instance, the contacting regions of the third interconnection elements, which are not connected to a coil terminal, remain free of potting compound. In this context, it is considered advantageous that sturdy mechanical fixing of the interconnection unit in position on the stator is achievable.

Further features and aspects of example embodiments of the present invention are described in more detail below with reference to the appended Figures.

BRIEF DESCRIPTION OF THE DRAWINGS

A perspective view of a first example embodiment of an interconnection unit situated on a stator of an electric motor is shown in FIG. 1. A side view of the stator and the interconnection unit of

FIG. 1 is shown in

Figure 1:
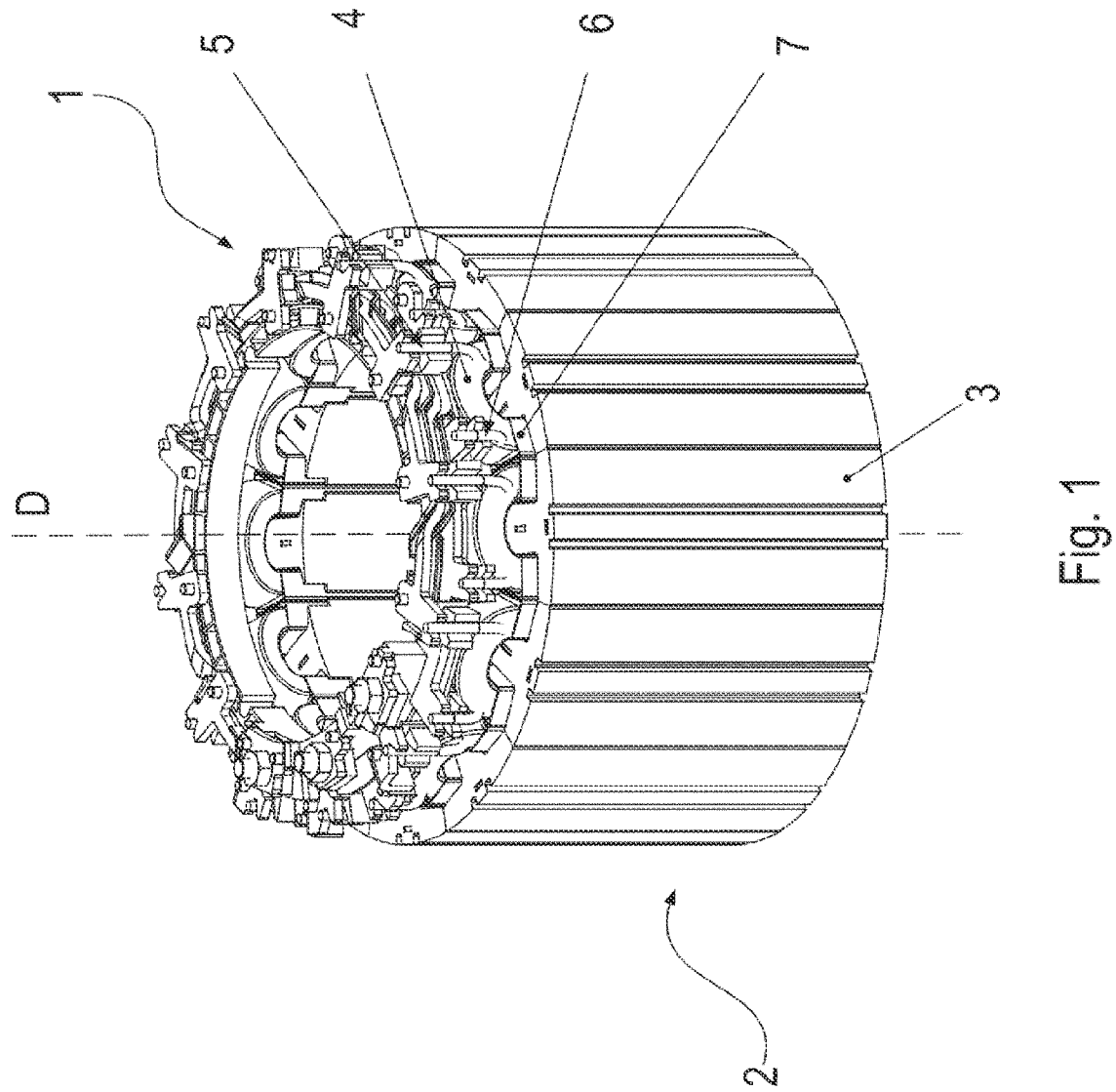

A top view of the stator and the interconnection unit of FIG. 1 is shown in

FIG. 2B.

A perspective view of a first interconnection element of the interconnection unit of FIG. 1 is shown in

FIG. 3A.

Figure 3A:
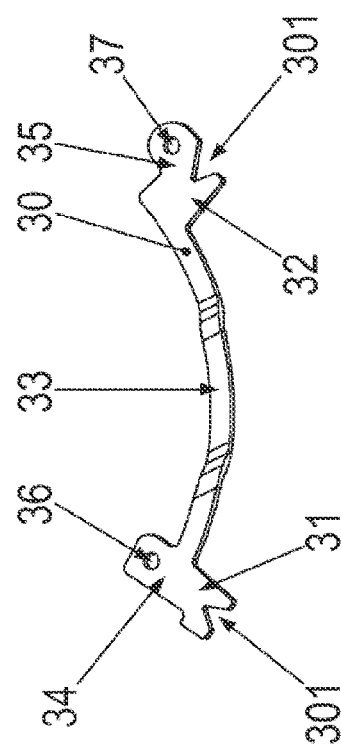

A side view of the first interconnection element of FIG. 3A is shown in

FIG. 3B.

Figure 3B:
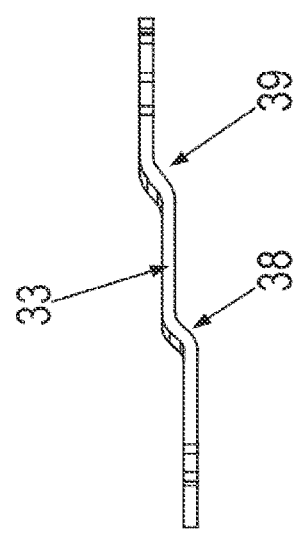
Figure 3C:
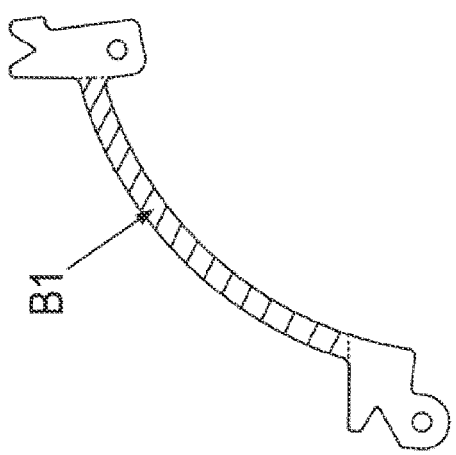

A projection in the axial direction onto a plane of the first interconnection element of FIGS. 3A and 3B is shown in FIG. 3C, the plane being perpendicular to the axis of rotation.

A perspective view of a second interconnection element of the interconnection unit of FIG. 1 is shown in

FIG. 4.

A perspective view of a third interconnection element of the interconnection unit of FIG. 1 is shown in

FIG. 5A.

Figure 5B:
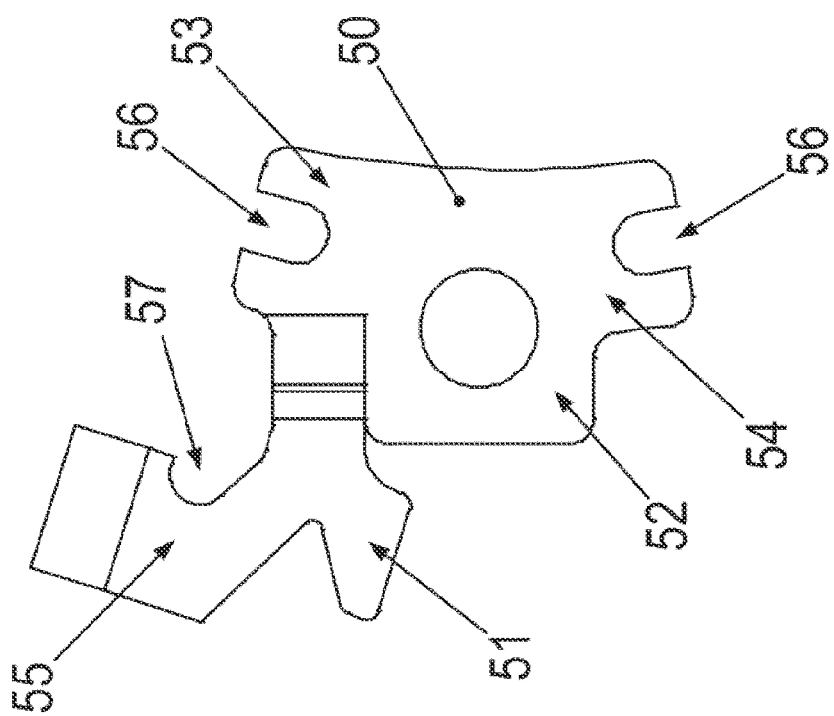
Figure 5A:
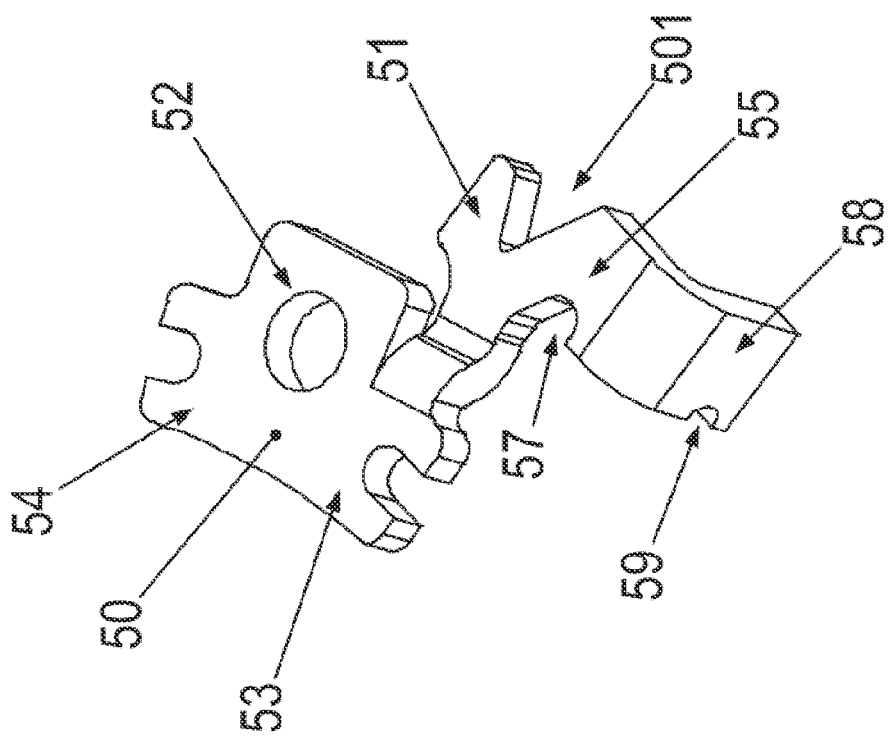

A top view of the third interconnection element of FIG. 5A is shown in

FIG. 5B.

A perspective view of the carrier part of the interconnection unit of FIG. 1, including the second interconnection element of FIG. 4 situated on top of it, is shown in

FIG. 6.

A perspective view of the first interconnection element of FIG. 3A, including an insulating part slid on, is shown in

FIG. 7A.

A perspective view of two first interconnection elements is shown in

FIG. 7B.

Figure 7A:
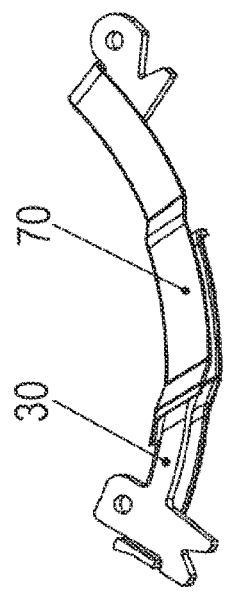
Figure 7B:
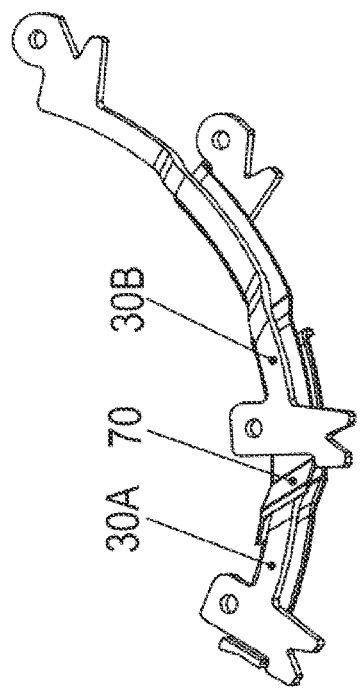
Figure 7C:
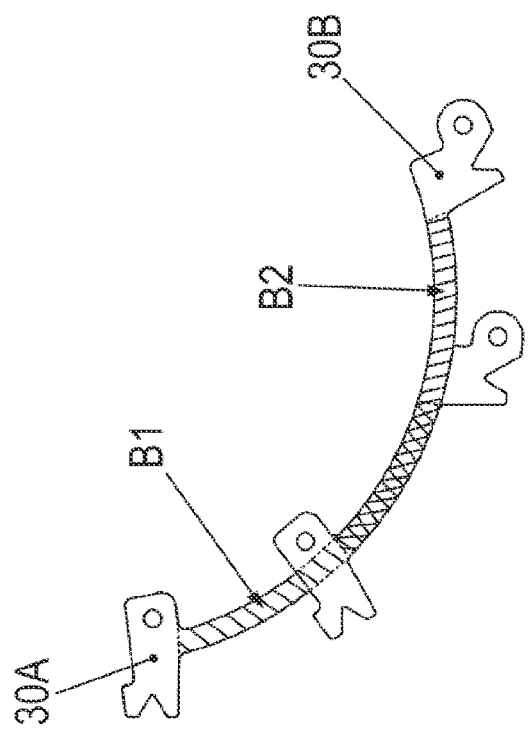

A projection in the axial direction onto a plane of the two first interconnection elements of FIG. 7B is shown in FIG. 7C, the plane being perpendicular to the axis of rotation.

A perspective view of the carrier part of the interconnection unit of FIG. 1, including interconnection elements situated on it, is shown in

FIG. 8.

A perspective view of an insulating part of a second example embodiment of the interconnection unit is shown in

FIG. 9A.

A perspective view of a first interconnection element of the interconnection unit is shown in

FIG. 9B.

A perspective view of the insulating part of FIG. 9A, together with the first interconnection element of FIG. 9B, is shown in

FIG. 9C.

A perspective view of the insulating part, the first interconnection element of FIG. 9C and a further first interconnection element are shown in

FIG. 9D.

A perspective view of an interconnection unit of the second example embodiment is shown in

FIG. 10.

DETAILED DESCRIPTION

Exemplary embodiments of the present invention are explained below in light of the attached drawing, where identical reference numerals are used for parts having the same function and are not described again with each figure.

FIG. 1 shows a perspective view of a first example embodiment of an interconnection unit 1, which is situated on an axial end of a stator 2 of an electric motor. Stator 2 of the electric motor is made up of individual stator segments 3. In the exemplary embodiment shown, stator 2 has twelve stator segments 3. In this instance, the number twelve is only illustrative; other numbers of stator segments are also possible. In this exemplary embodiment, stator segments 3 are, for example, constructed as stamp-packaged, sheet-metal packs.

Stator segments 3 are interconnected in such a manner, that they form a substantially cylindrical stator 2. A rotor, which is pivoted about an axis of rotation D, is positioned in the interior of stator 3. The rotor and stator 2 are positioned concentrically to axis of rotation D. The rotor, for example, includes permanent magnets, and the electric motor is, for example, arranged as a permanent-magnet synchronous motor.

Each stator segment 3 has a stator tooth, about which, in each instance, a coil 4 is wound. The coil is made up of insulated winding wire. The two ends of the winding wire are bare and form the two coil terminals 5, 6. In FIG. 1, coils 4 are only illustrated schematically. For example, insulating paper 7 for electrical insulation is situated between coils 4 and stator segments 3.

Figure 2A:
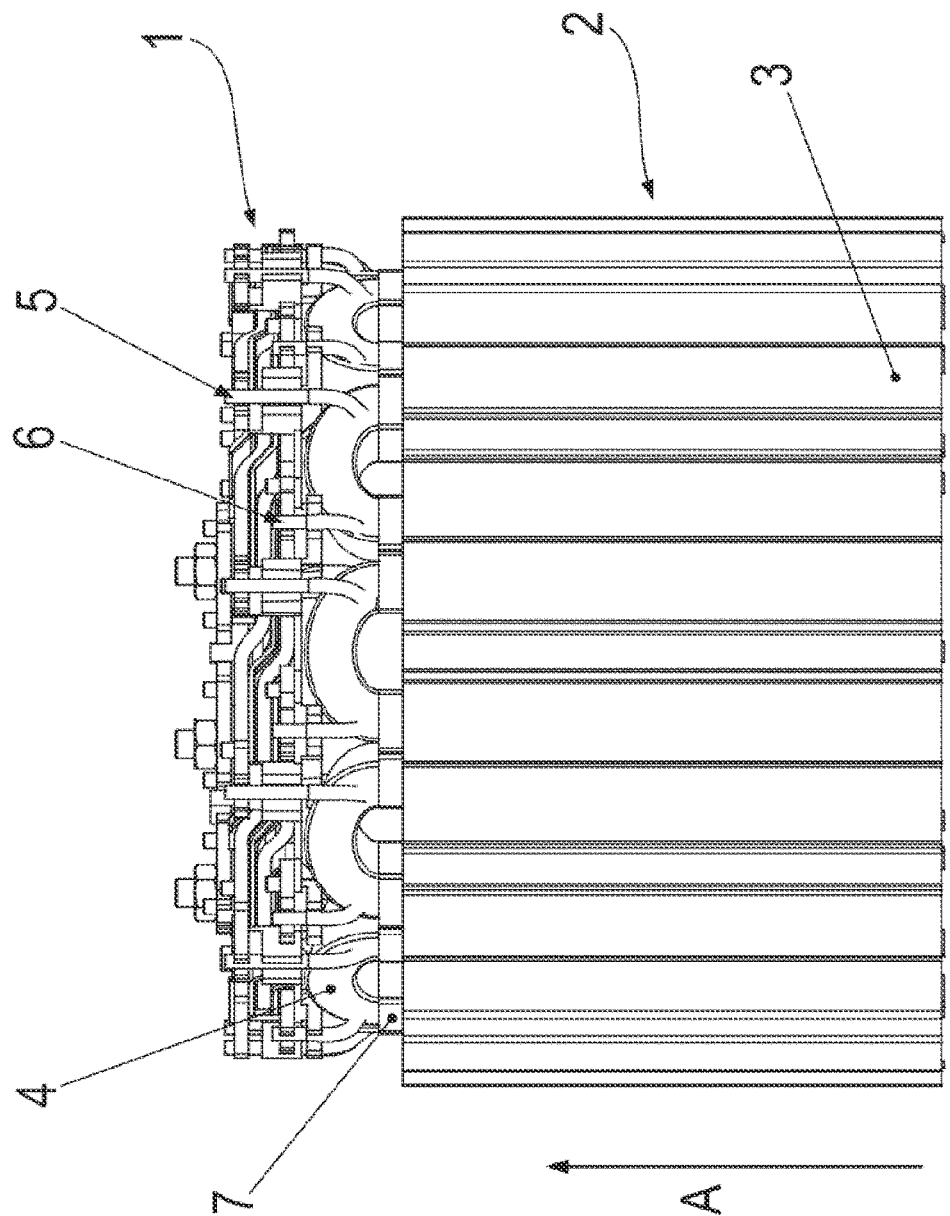
FIG. 2A.
Figure 2B:
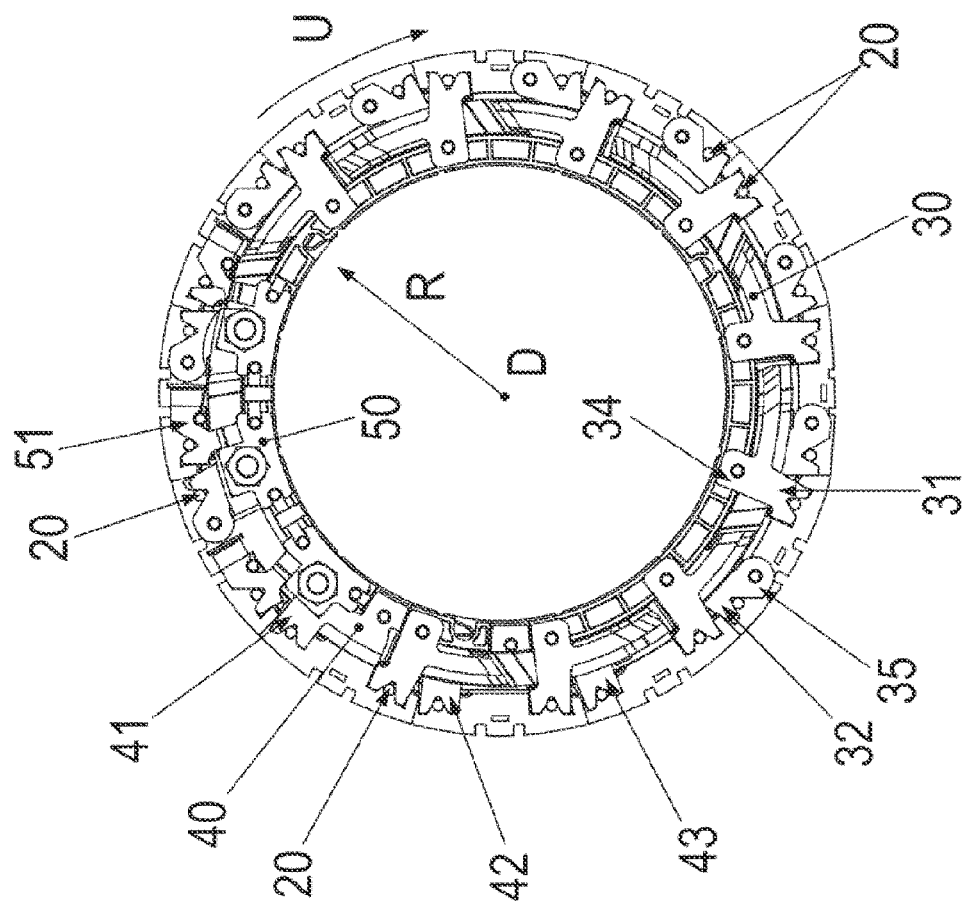

FIG. 2A shows a side view of the arrangement illustrated in FIG. 1. Direction A, which extends parallelly to axis of rotation D, is referred to as an axial direction. FIG. 2B shows a top view of the arrangement illustrated in FIG. 1. As shown, radial direction R is defined as starting out from axis of rotation D. Thus, radial direction R extends perpendicularly to axial direction A. Circumferential direction U extends along the circumference of stator 2 and is shown in FIG. 2B, as well.

With the aid of interconnection unit 1, individual coils 4 are interconnected to form a multiphase winding. In the present exemplary embodiment, the twelve coils 4 are interconnected by a star connection; a three-phase winding being formed. Therefore, four individual coils 4 are assigned to each phase. Within one phase, the four coils 4 are connected in series with the aid of interconnection unit 1. All three phases are interconnected, in turn, at the star point. For a more effective overview, the individual elements of interconnection unit 1 are explained in the following figures.

Interconnection unit 1 includes a plurality of interconnection elements 30, 40, 50 for interconnecting the coil terminals, as well as a carrier part 60 for holding interconnection elements 30, 40, 50. In order to interconnect the twelve coils 4 shown in this exemplary embodiment, using a star connection, to form a three-phase winding, nine first interconnection elements 30 and one second interconnection element 40 are necessary. If n denotes the number of phases and z denotes the number of stator segments 3 and, accordingly, the number of coils 4, then (z-n) first interconnection elements 30 and one second interconnection element 40 are necessary for a star connection. Thus, second interconnection element 40 is only necessary for interconnection by a star connection. For other types of interconnection, such as a delta connection, it may be omitted.

FIG. 3A shows a perspective view of a first interconnection element 30. First interconnection element 30 is made of sheet metal, e.g., sheet steel or sheet copper, and it is, for example, fabricated as a stamped and bent part. In the present exemplary embodiment, first interconnection element 30 includes a first contacting region 31 and a second contacting region 32. The two contacting regions 31, 32 are set apart from each other. A connecting region 33 is situated between the two contacting regions 31, 32. Connecting region 33 joins the two contacting regions 31, 32. Contacting regions 31, 32 are used for connecting first interconnection element 30 electrically and mechanically to coil terminals 5, 6. In this context, each contacting region 31, 32 is connected to a coil terminal 5, 6. Contacting regions 31, 32 have a V-shaped notch 301 for receiving a coil terminal 5, 6 in the form of a winding wire.

In addition to contacting regions 31, 32, first interconnection element 30 includes a first attachment region 34 and a second attachment region 35. Attachment regions 34, 35 are used for attaching first interconnection element 30 to carrier part 60. In the present exemplary embodiment, attachment regions 34, 35 each include a through-recess 36, 37 in the form of a cylindrical hole. Alternatively, half-open recesses in the form of, e.g., an axially extending groove are also possible.

FIG. 3B shows a side view of the first interconnection element 30 from FIG. 3A. In the present exemplary embodiment, the first interconnection element includes a first step 37 and a second step 38. These steps 37, 38 are, for example, produced by bending. Due to these steps 37, 38, first and second attachment regions 34, 35 have different axial positions.

FIG. 3C shows a perpendicular projection of first interconnection element 30 from FIG. 3A onto a plane perpendicular to the axis of rotation. Thus, steps 38, 39 from FIG. 3B are not visible. In this instance, hatched region B1 shows the region covered by connecting region 33 in the circumferential and radial directions.

FIG. 4 shows a perspective view of a second interconnection element 40. Second interconnection element 40 is made of sheet metal, e.g., sheet steel or sheet copper, and it is, for example, fabricated as a stamped and bent part. In the present exemplary embodiment, second interconnection element 40 includes a first contacting region 41, a second contacting region 42 and a third contacting region 43. The three contacting regions 41, 42, 43 are set apart from each other. A connecting region 44 is situated between first contacting region 41 and third contacting region 43. Second contacting region 42 is also situated on connecting region 44. Thus, connecting region 44 interconnects the three contacting regions 41, 42, 43. Contacting regions 41, 42, 43 are used for connecting second interconnection element 40 electrically and mechanically to coil terminals 5, 6. In this context, each contacting region 41, 42, 43 is connected to a coil terminal 5, 6. Contacting regions 41, 42, 43 have a V-shaped notch 401 for receiving a coil terminal 5, 6 in the form of a winding wire. In the case of the interconnection of three phases by a star connection, second interconnection element 40 forms the star point, at which the three phases are interconnected.

In addition to contacting regions 41, 42, 43, second interconnection element 40 includes a first attachment region 45 and a second attachment region 46. Attachment regions 45, 46 are used for attaching second interconnection element 40 to carrier part 60. In the present exemplary embodiment, attachment regions 45, 46 each include a through-recess 47 in the form of a cylindrical hole. Alternatively, half-open recesses in the form of, e.g., an axially extending groove are also possible.

FIG. 5A shows a perspective view of a third interconnection element 50. Third interconnection element 50 is made of sheet metal, e.g., sheet steel or sheet copper, and it is, for example, fabricated as a stamped and bent part. In the present exemplary embodiment, third interconnection element 50 includes a first contacting region 51 and a second contacting region 52. The two contacting regions 51, 52 are set apart from each other. First contacting region 51 is used for connecting third interconnection element 50 to a coil terminal 5, 6 electrically and mechanically and includes a V-shaped notch 501 for this. Second contacting region 52 is used for connecting third interconnection element 50 electrically and mechanically to a phase conductor. Thus, third interconnection elements 50 form the connections of the electric motor to phases U, V, W. Therefore, in the case of a three-phase winding, three third interconnection elements 50 are needed.

The connection between third interconnection elements 50 and the phase conductors may be accomplished directly or indirectly, using a screw 80 having a corresponding nut 81. In principle, a direct connection between the phase conductors and coil terminals 5, 6 may also be produced, which means that third interconnection elements 50 may be omitted. However, third interconnection elements 50 simplify the manufacturing method of the electric motor and provide for simple connection of the phase conductors to the electric motor. In the present exemplary embodiment, second contacting region 52 includes a through-recess. A screw 80, which is used as a terminal for a cable lug of the phase conductor, is passed through this recess. A nut 81 is used for attaching the cable lug to the third interconnection element.

In addition to contacting regions 51, 52, third interconnection element 50 includes a first attachment region 53, a second attachment region 54 and a third attachment region 55. Attachment regions 53, 54, 55 are used for attaching third interconnection element 50 to carrier part 60.

In the present exemplary embodiment, attachment regions 53, 54, 55 include half-open recesses 56, 57 in the form of axially extending grooves. As an alternative, closed recesses, e.g., in the form of cylindrical holes, are also possible.

Figure 6:
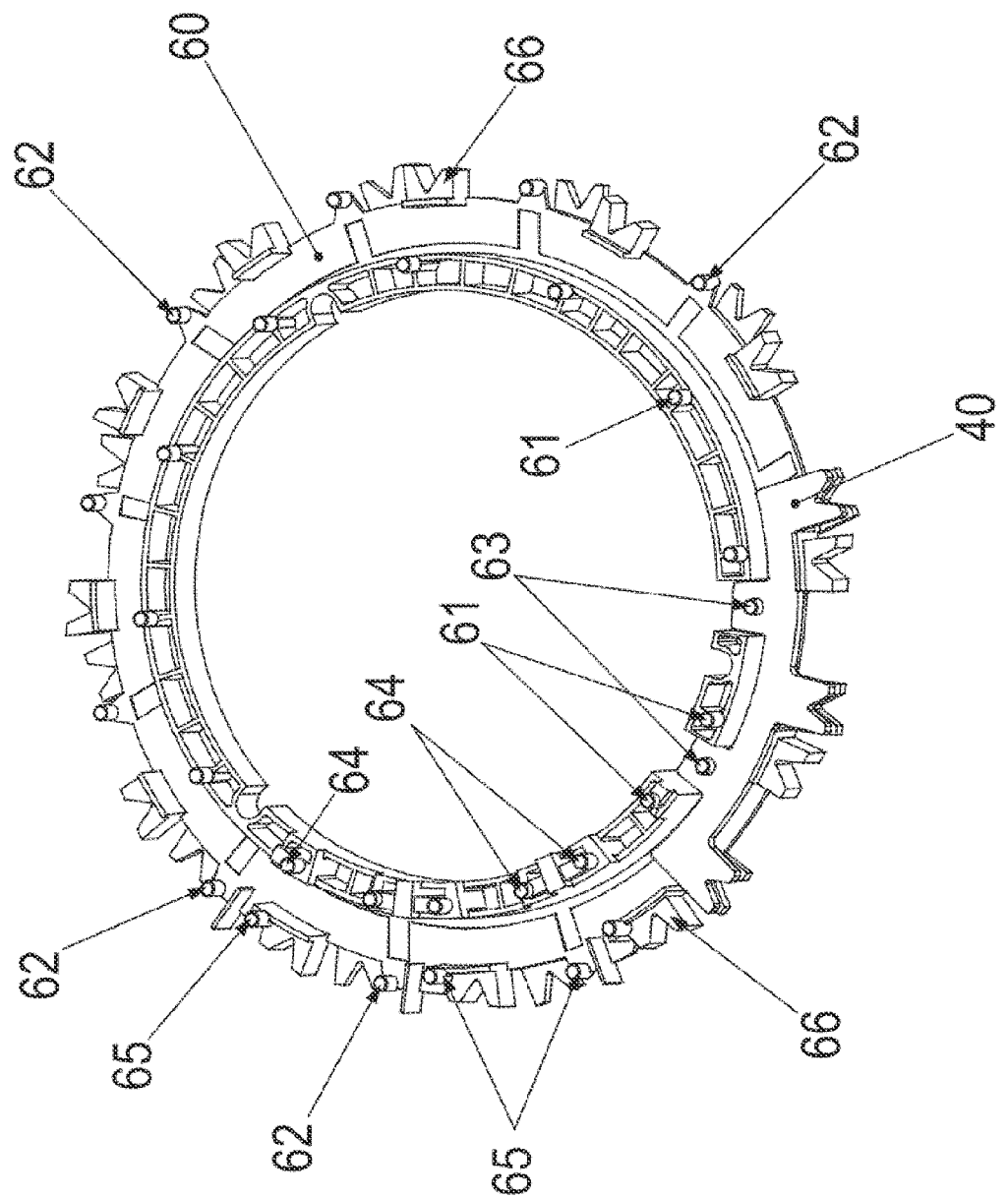

FIG. 6 shows carrier part 60, including a second interconnection element 40 supported on it. Carrier part 60 is substantially annular, and in this exemplary embodiment, it is manufactured as a plastic injection-molded part. It is, for example, produced in one piece. As shown in FIG. 1, carrier part 60 is positioned concentrically to axis of rotation D, on an axial end of stator 2. Carrier part 60 includes axial projections 61, 62, 63, 64, 65 in the form of rivet pins. In this exemplary embodiment, projections 61, 62, 63, 64, 65 are cylindrical, but other shapes are also possible. Rivet pins 61, 62, 63, 64, 65 are, for example, produced to be complementary to corresponding recesses 36, 37, 47, 56, 57, in order to provide a rigid mechanical connection between carrier part 60 and interconnection element 30, 40, 50.

Carrier part 60 includes first rivet pins 61 and second rivet pins 62 for holding first interconnection element 30. Carrier part 60, for example, includes third rivet pins 63 for holding second interconnection element 40. Carrier part 60, for example, has fourth rivet pins 64 and fifth rivet pins 65 for holding third interconnection elements 50.

The first, third and fourth rivet pins are, for example, situated close to the inner circumference of carrier part 60, while the second and fifth rivet pins are situated close to the outer circumference of carrier part 60.

Carrier part 60 includes a plurality of guide regions 66 distributed on its outer circumference. Each guide region 66 includes a V-shaped notch and is used for guiding coil terminals 5, 6 in the axial direction during the establishment of the electrical connection between coil terminals 5, 6 and contacting regions 31, 32, 41, 42, 43, 51. For this purpose, the position of a guide region 64 in the radial and circumferential directions is substantially identical to the position of a corresponding contacting region 31, 32, 41, 42, 43, 51. A guide region 66 is situated axially below a contacting region 31, 32, 41, 42, 43, 51. In this context, the V-shaped notch of guide region 66 is offset slightly in the radial direction, for example, 0.5 mm, towards the inner circumferential side, so that effective contacting between coil terminal 5, 6 and contacting region 31, 32, 41, 42, 43, 51 is ensured.

During the manufacturing method, coil terminals 5, 6 are initially bent in such a manner, that they point radially outwards. Interconnection unit 1 is subsequently placed on stator 2, and then, coil terminals 5, 6 are bent into position in such a manner, that they point axially upwards and touch corresponding contacting regions 31, 32, 41, 42, 43, 51. In this connection, guide regions 66 support the operation of contacting, so that coil terminals 5, 6 are oriented substantially parallelly to axial direction A.

The starting point in the method for manufacturing interconnection unit 1 is the carrier part 60 made of insulating material. In the present exemplary embodiment, this is made of plastic with the aid of an injection molding method. After that, as shown in FIG. 6, second interconnection element 40 is positioned on carrier part 60.

Through-recesses 47 of attachment regions 45, 46 of second interconnection element 40 are used as a holding device, which means that it is possible for third rivet pins 63 to be passed through recesses 47.

In a subsequent manufacturing step, first interconnection elements 30 are positioned on carrier part 60, namely, in such a manner, that the region B1, B2 covered by connecting region 33 of one of the first interconnection elements 30 in overlaps, in the circumferential and radial directions, in each instance, a region B1, B2 covered by the connecting region 33 of another of the first interconnection elements 30. In other words, the first interconnection elements are at least partially stacked one on top of the other in the circumferential direction, so that a more compact configuration is rendered possible.

Through-recesses 36, 37 of attachment regions 34, 35 of first interconnection elements 30 are used for holding first interconnection elements 30, which means that it is possible to pass first and second rivet pins 61, 62 through recesses 36, 37. Since one recess 36 of the two recesses 36, 37 of a first interconnection element 30 is situated radially further inside than the recess 37, stable support is provided. In particular, tilting of first interconnection elements 30 is prevented. In other words, first attachment regions 34 have a radial position, which is different from the radial position of second attachment regions 35. First and second rivet pins 61, 62 and first interconnection elements 30 are positioned and shaped in such a manner, that the positioned, first interconnection elements 30 do not touch each other. Thus, they are positioned so as to be spaced apart from each other. Due to this, in principle, no further electrical insulation is necessary, since in a final manufacturing step, the stator is normally encapsulated by potting compound, which is used as insulating material.

It is considered advantageous that the electrical insulation between first interconnection elements 30 may also be provided by prefabricated insulating parts. To this end, for example, plastic insulating parts 70 are produced with the aid of an injection molding method. FIG. 7A shows an insulating part 70, which partially surrounds a first interconnection element. In this exemplary embodiment, insulating part 70 is shaped in such a manner, that it may be slid onto first interconnection element 30 in the radial direction. In this context, first interconnection element 30 is partially surrounded by insulating part 70 in the circumferential direction in such a manner, that displacement of insulating part 70 and first interconnection element 30 relative to each other in this direction is not possible. Thus, a bilateral, form-locked connection in the circumferential direction is present. In addition, first interconnection element 30 is partially surrounded by insulating part 70 in the axial direction in such a manner, that displacement of insulating part 70 and first interconnection element 30 relative to each other in this direction is not possible. Thus, a bilateral, form-locked connection in the axial direction is present. First interconnection element 30 is connected to insulating part 70 in the radial direction in a form-locked manner on only one side, which means that displacement relative to each other is possible.

If insulating parts 70 are used for electrical insulation, then it is possible for only every second of the first interconnection elements 30 to be surrounded by an insulating part 70 in the circumferential direction, as described above. FIG. 7B shows the first interconnection element 30A having a slid-on insulating part 70 of FIG. 7A, and in addition, a further, first interconnection element 30B, which is merely placed on insulating part 70. Subsequently, a first interconnection element 30 surrounded by an insulating part 70 is positioned again on this further, first interconnection element 30B.

FIG. 7C shows a perpendicular projection of the two first interconnection elements 30A, 30B of FIGS. 7A and 7B onto a plane perpendicular to the axis of rotation. In this instance, as in FIG. 3C, hatched region B1 shows the region covered by connecting region 33 of a first interconnection element 30 in the circumferential and radial directions. In a manner analogous to that, hatched region B2 indicates the region covered by connecting region 33 of the other, first interconnection element 30B in the circumferential and radial directions. These two regions overlap partially. In this exemplary embodiment, the regions covered by the two connecting regions 33 in the radial direction are identical. However, it is also possible for these to be different.

Figure 8:
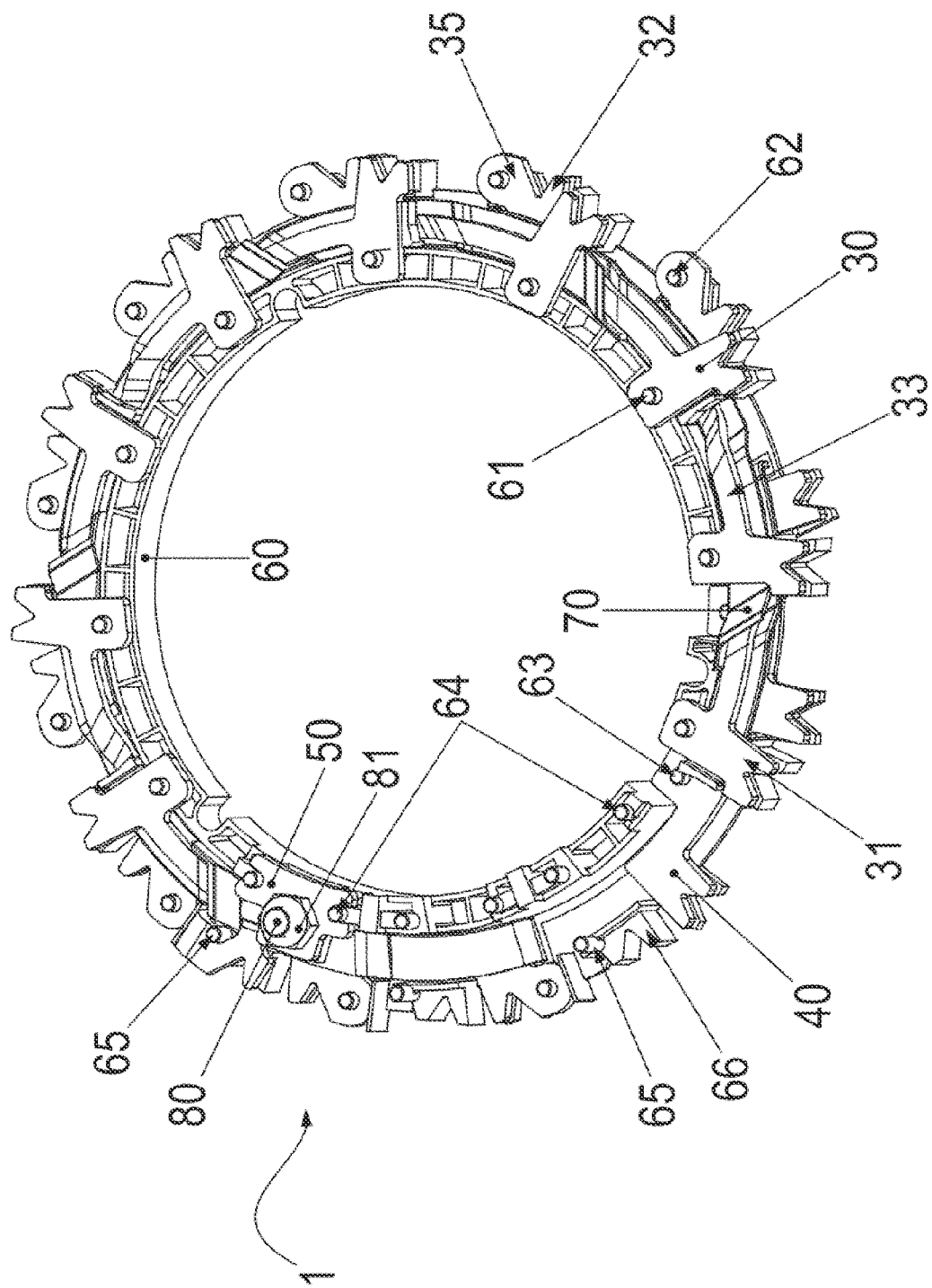

FIG. 8 shows carrier part 60 and second interconnection element 40 of FIG. 6, including the nine first interconnection elements 30 positioned on it, as well as the insulating parts 70 situated between them. In this exemplary embodiment, since only every second interconnection element 30 is surrounded by an insulating part 70, only five insulating parts 70 are necessary. In addition, a third interconnection element 50, which is held by two fourth rivet pins 64 and one fifth rivet pin 65 of carrier part 60, is also shown in FIG. 8. A square-headed bolt 80 having a corresponding nut 81 is used for contacting third interconnection element 50 with the phase conductor. The head of the bolt is situated axially below the through-recess of second attachment region 52, so that hexagonal nut 81 is accessible from above. This allows simple contacting of the phase conductor with third interconnection element 50 with the aid of, e.g., cable lugs.

In this exemplary embodiment, in addition to the third interconnection element 50 shown, two further, third interconnection elements 50 are used, which are positioned next to and counterclockwise from shown, third interconnection element 50 in the circumferential direction. All three third interconnection elements 50 are shown in FIG. 1.

After all interconnection elements 30, 40, 50 are positioned on carrier part 60, they are joined to carrier part 60. To this end, in the present exemplary embodiment, the free ends of rivet pins 61, 62, 63, 64, 65 are deformed into rivet heads in such a manner, that the diameter of the rivet heads in the plane perpendicular to the axis of rotation is greater than the diameter of the corresponding recesses. The deformation may be produced, for example, with the aid of ultrasonic welding or hot crimping or hot stamping. If, during the deformation, only the rivet pin is deformed without an integral connection between the carrier part and the interconnection elements being formed in the process, then a form-locked connection is produced. However, it is also possible that, alternatively or additionally, an integral connection between the carrier part and the interconnection elements is produced. After interconnection elements 30, 40, 50 are joined to carrier part 60, coil terminals 5, 6 are connected to corresponding contacting regions 31, 32, 41, 42, 51 of interconnection elements 30, 40, 50, in order to produce an electrical connection. To this end, the bare ends of the wire of the coils are inserted into V-shaped notches 301, 401, 501 of contacting regions 31, 32, 41, 42, 51, and an integral connection between the wire and the interconnection element is produced. In this exemplary embodiment, this is accomplished with the aid of laser welding. However, other methods are also possible.

After coils 4 of the electric motor are interconnected in this manner with the aid of interconnection unit 1 to form a multiphase winding, stator 2, together with the interconnection unit 1 situated on an axial end of the stator, are encapsulated by potting compound in order to fix them in position mechanically. If no insulating parts 70 are used, this potting compound is used as electrical insulation between interconnection elements 30, 40, 50.

If three third interconnection elements 50 are used, as shown in the present exemplary embodiment, then, during the encapsulation, care must be taken that the second attachment regions 54 of third interconnection elements 50 remain free of potting compound. In order to ensure that third interconnection elements 50 are sufficiently surrounded by the potting compound and that rigid support is attained, third interconnection elements 50 include, for example, anchor regions 58, which point axially from the third attachment region in the direction of stator 2. For more effective anchoring in the potting compound, anchor region 58 includes, for example, an undercut 59.

FIG. 9B alternatively shows a first interconnection element 90 for a second exemplary embodiment of an interconnection unit 1. This first interconnection element 90 also includes a first contacting region 91 and a second contacting region 92. Contacting regions 91, 92 each include a catch arm 93, by which a specific coil terminal 5, 6 may be captured and held in a friction-locked manner, in particular, pinched between the catch arms. In addition, coil terminals 5, 6 are, for example, connected to the catch arms in an integral manner with the aid of contact welding. Catch arms 93 are open in a V-shape; the catch arms forming the arms of the V. Rapid and not very complex electrical connection of coil terminals 5, 6 to contacting regions 91, 92 is provided with the aid of catch arms 93, in that when interconnection unit 1 is rotated relative to stator 2, coil terminals 5, 6 are captured in the inner region spanned by contacting region 91, 92, that is, in particular, in the inner region spanned by the V of V-shaped catch arm 93. Thus, specific contacting region 91, 92 guides respective coil terminal 5, 6 into the connecting position at the inner tip of the V. As soon as the rotation is finished, joining by contact welding is carried out. To this end, the specific arms of contacting region 91, 92, that is, catch arms 93, are pressed together by suitably bending them, until coil terminal 5, 6 is held by friction, in particular, clamped, by catch arms 93 of contacting region 91, 92. Contact welding is then carried out, so that the electrical connection between coil terminal 5, 6 and contacting region 91, 92 may be produced without tin solder.

As also in the case of the first exemplary embodiment, connecting region 94 of first interconnection element 90 of the second exemplary embodiment has two axial steps 95, 96.

However, in contrast to the first exemplary embodiment, this first interconnection element 90 has only one attachment region 97. The attachment region includes a through-recess 98.

FIG. 9A shows an insulating part 99, which is slid onto first interconnection element 90. FIG. 9C shows first interconnection element 90 having insulating part 99 slid on.

FIG. 9D shows first interconnection element 90A having a slid-on insulating part 99 from FIG. 9C, and, in addition, a further, first interconnection element 90B, which is positioned on insulating part 99. In this context, the regions covered by the two connecting regions 94 of the two, first interconnection elements 90A, 90B overlap in the circumferential and radial directions.

Figure 10:
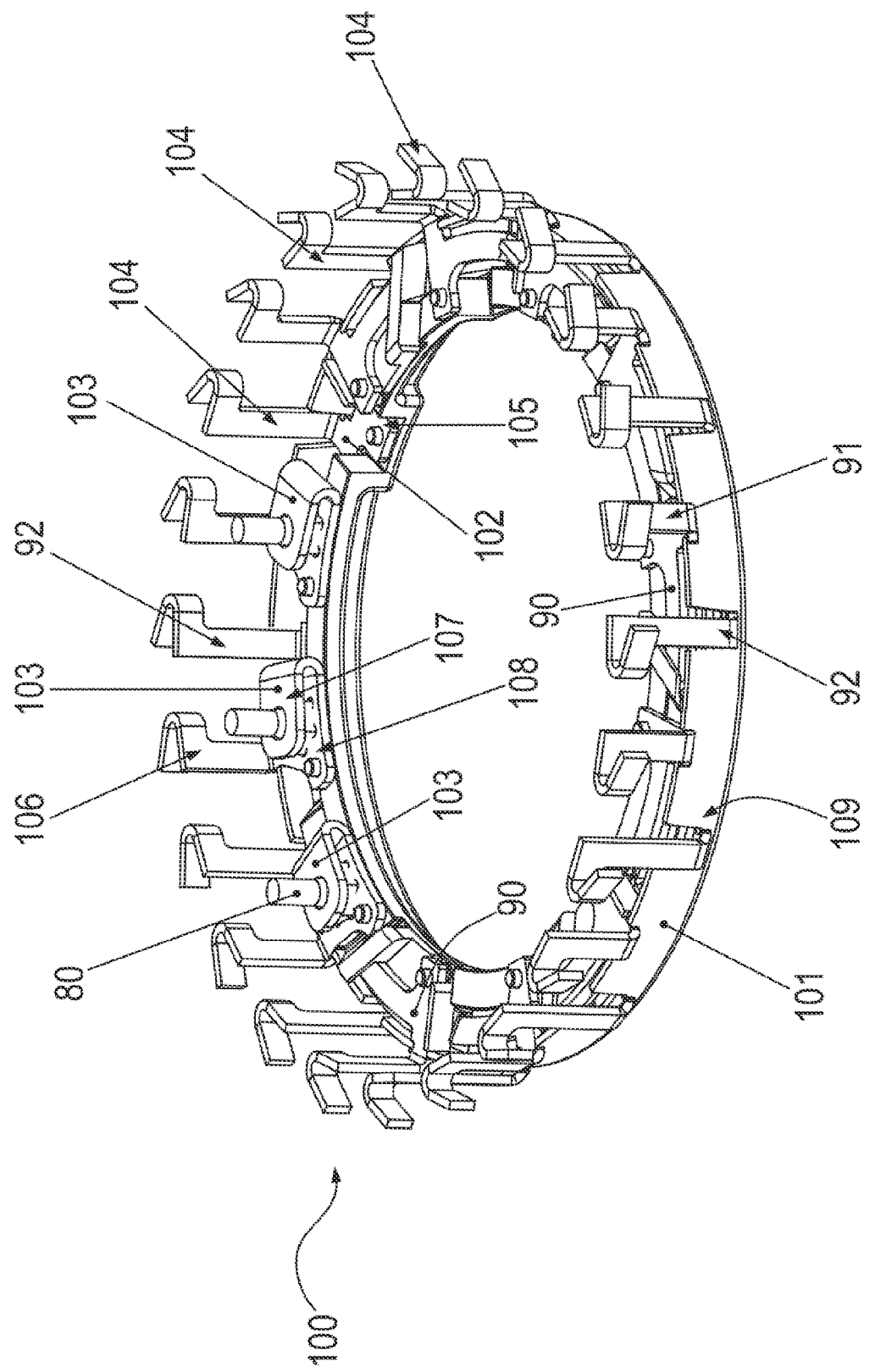

FIG. 10 shows interconnection unit 100 of the second exemplary embodiment. As in the case of the first exemplary embodiment, interconnection unit 100 includes a carrier part 101 for holding the nine first interconnection elements 90, second interconnection element 102 and the three third interconnection elements 103.

As in the first exemplary embodiment, second interconnection element 102 has three contacting regions 104. As in the first exemplary embodiment, second interconnection element 102 includes two attachment regions 105, of which only one is visible due to the perspective view.

As in the first exemplary embodiment, third interconnection element 103 includes a first contacting region 106 for contacting with a coil terminal 5, 6 and a second contacting region 107 for contacting with a phase conductor. In contrast to the first exemplary embodiment, third interconnection element 103 has only one attachment region 108.

In the second exemplary embodiment, the form-locked connection between interconnection elements 90, 102, 103 and carrier part 101 is also obtained by deforming rivet pins of the carrier part into rivet heads; the rivet pins being able to be passed through recesses in the respective attachment regions.

In the second exemplary embodiment, the positioning of interconnection elements 90, 102, 103 on carrier part 101 is accomplished, in that carrier part 101 has a circumferential annular groove for receiving interconnection elements 90, 102, 103. At its outer circumference, carrier part 101 additionally includes recesses 109 in the groove wall, through which, in each instance, contacting regions 91, 92, 104, 106 may be passed. This also contributes to the exact positioning of the components.

In the two exemplary embodiments, in each instance, all of the first interconnection elements 30, 90 are manufactured identically, that is, are identical parts. Likewise, in each instance, third interconnection elements 50, 103 are also manufactured identically, that is, are also identical parts. An advantage of this is that the parts may be manufactured at lower cost. However, it is also possible for first interconnection elements 30, 90 and/or third interconnection elements 50, 103 to be manufactured differently.

In the two exemplary embodiments, both the regions covered by connecting regions 33, 94 of first interconnection elements 30, 90 in the axial direction and the regions covered by connecting regions 33, 94 of first interconnection elements 30, 90 in the radial direction are identical. However, it is also possible for these regions to be different.

LIST OF REFERENCE NUMERALS 1 interconnection unit
2 stator
3 stator segment
4 coil
5 first coil terminal
6 second coil terminal
7 insulating paper
30 first interconnection element
31 first contacting region of a first interconnection element
32 second contacting region of a first interconnection element
33 connecting region of a first interconnection element
34 first attachment region of a first interconnection element
35 second attachment region of a first interconnection element
36 first through-recess in a first interconnection element
37 second through-recess in a first interconnection element
38 first step of a first interconnection element
39 second step of a first interconnection element
301 V-shaped notch
40 second interconnection element
41 first contacting region of the second interconnection element
42 second contacting region of the second interconnection element
43 third contacting region of the second interconnection element
44 connecting region of the second interconnection element
45 first attachment region of the second interconnection element
46 second attachment region of the second interconnection element
47 through-recess in the second interconnection element
401 V-shaped notch
50 third interconnection element
51 first contacting region of a third interconnection element
52 second contacting region of a third interconnection element
53 first attachment region of a third interconnection element
54 second attachment region of a third interconnection element
55 third attachment region of a third interconnection element
56 through-recess in a third interconnection element
57 through-recess in a third interconnection element
58 anchor region of a third interconnection element
60 carrier part
61 first rivet pin
62 second rivet pin
63 third rivet pin
64 fourth rivet pin
65 fifth rivet pin
66 guide region
70 insulating part
80 screw
81 nut
90 first interconnection element
91 first contacting region of a first interconnection element 92 second contacting region of a first interconnection element
93 catch arm
94 connecting region of a first interconnection element
95 axial step
96 axial step
97 attachment region of a first interconnection element
98 through-recess in a first interconnection element
99 insulating part
100 interconnection unit
101 carrier part
102 second interconnection element
103 third interconnection element
104 contacting region of a second interconnection element
105 attachment region of a second interconnection element
106 first contacting region of a third interconnection element
107 second contacting region of a third interconnection element
108 attachment region of a third interconnection element

What is claimed is:

1. An electric motor, comprising:
a rotor rotatable about an axis of rotation; and
a stator including a plurality of coils and a plurality of stator segments, each coil including two coil terminals, each stator segment including a single coil, the coils being interconnected by an interconnection unit including a carrier part adapted to hold a plurality of interconnection elements set apart from each other, the interconnection elements including at least three first interconnection elements that are positioned along an axial direction, each of the at least three first interconnection elements including two contacting regions set apart from each other and an arcuate connecting region joined to the contacting regions, the contacting regions of each of the at least three first interconnection elements being connected to one of the coil terminals at a connecting point;
wherein, when viewing axially toward the interconnection unit, the arcuate connecting region of a first one of the at least three first interconnection elements overlap, in circumferential and radial directions, the arcuate connecting region of a second one of the of the at least three first interconnection elements; and
wherein the at least three first interconnection elements are identical.

2. The electric motor according to claim 1, wherein the electric motor is arranged as a permanent-magnet synchronous motor.

3. The electric motor according to claim 1, wherein the coils are connected by a star connection.

4. The electric motor according to claim 1, wherein the carrier part is arranged as substantially annular carrier part, and/or is formed of an insulating material.

5. The electric motor according to claim 1, wherein the interconnection unit is positioned at an axial end of the stator and/or concentrically to the axis of rotation.

6. The electric motor according to claim 1, wherein each of the at least three first interconnection elements include exactly two contacting regions.

7. The electric motor according to claim 1, wherein the arcuate connecting region is arranged between the respective contacting regions of each of the at least three first interconnection elements.

8. The electric motor according to claim 1, wherein the contacting regions of each of the at least three first interconnection elements are electrically connected and/or integrally connected by laser welding to one of the coil terminals at the connecting point.

9. The electric motor according to claim 1, wherein the arcuate connecting regions of the at least three first interconnection elements in an axial direction are identical and/or the arcuate connecting regions of the at least three first interconnection elements in the radial direction are identical.

10. The electric motor according to claim 1, wherein the contacting regions of each of the at least three first interconnection elements are shaped such that respective connecting points have substantially the same radial position at an outer circumference of the carrier part and/or have the same axial position.

11. The electric motor according to claim 1, wherein the arcuate connecting region of each of the at least three first interconnection elements has an approximately rectangular cross section, having a dimension in an axial direction less than a dimension in the radial direction, at least one arcuate connecting region of one of the at least three first interconnection elements includes two axial steps, and/or all of the arcuate connecting regions of the at least three first interconnection elements include two axial steps.

12. The electric motor according to claim 1, wherein each of the at least three first interconnection elements includes a first attachment region for form-locked and/or integral connection to the carrier part, each first attachment region includes a first through-recess in an axial direction, the carrier part includes a plurality of rivet pins extending in an axial direction, a first rivet pin adapted to pass through each of the first recesses, free ends of the first rivet pins adapted to be deformed into rivet heads by ultrasonic welding, each of the at least three first interconnection elements including a second attachment region for form-locked and/or integral connection to the carrier part, each second attachment region including a second through-recess in the axial direction, a second rivet pin adapted to pass through each of the second recesses, and/or free ends of the second rivet pins adapted to be deformed into rivet heads by ultrasonic welding.

13. The electric motor according to claim 12, wherein the first attachment regions of each of the at least three first interconnection elements have a same first radial position and/or a same first axial position.

14. The electric motor according to claim 1, wherein the arcuate connecting region of the first one of the first interconnection elements overlaps, in the circumferential and radial directions, the arcuate connecting region of each of the second one of the interconnection elements and a third one of the interconnection elements.

15. The electric motor according to claim 1, wherein the plurality of interconnection elements includes a second interconnection element having three and/or exactly three contacting regions, each contacting regions of the second interconnection element being connected to, electrically connected to, and/or integrally connected by laser welding to one of the coil terminals, the second interconnection element having two and/or exactly two attachment regions for form-locked and/or integral connection to the carrier part, each attachment region having a through-recess in the axial direction, a third rivet pin adapted to pass through each of the recesses, free ends of the third rivet pins adapted to be deformed into rivet heads by ultrasonic welding.

16. The electric motor according to claim 15, wherein the second interconnection element and at least one of the at least three first interconnection elements overlap in the radial direction and/or the second interconnection element and at least one of the at least three first interconnection elements overlap in the circumferential and radial directions.

17. The electric motor according to claim 1, wherein the plurality of interconnection elements include a plurality of third interconnection elements, each third interconnection element having a first contacting region and a second contacting region that are different, the first contacting region of a third interconnection element being connected to, electrically connected to, and/or integrally connected by laser welding to one of the coil terminals, each third interconnection element having a first and a second attachment region for form-locked and/or integral connection to the carrier part, each attachment region having a through-recess in the axial direction, a fourth rivet pin adapted to pass through each recess, free ends of the fourth rivet pins adapted to be deformed into rivet heads by ultrasonic welding, each third interconnection element having a third attachment region for form-locked and/or integral connection to the carrier part, the third attachment region bordering on the first contacting region of the respective, third interconnection element, the third attachment region having a through-recess in the axial direction, through which a fifth rivet pin is passable, free ends of the fifth rivet pins adapted to be deformed into rivet heads by ultrasonic welding, the third interconnection elements being identical.

18. The electric motor according to claim 1, wherein the carrier part includes a plurality of guide regions at an outer circumference adapted to guide the coil terminals in an axial direction, each of the two contacting regions of each of the at least three first interconnection elements connected to a coil terminal being assigned a guide region, a shape of the guide region being substantially identical to a shape of the respectively assigned contacting region.

19. The electric motor according to claim 1, wherein at least one of the at least three first interconnection elements is surrounded by an insulating part made of an injection molded insulating material, the surrounded first interconnection element and the surrounding insulating part are joined on two sides in a form-locked manner in the circumferential direction and/or joined on two sides in a form-locked manner in the axial direction and/or joined on one side in a form-locked manner in the radial direction.

20. The electric motor according to claim 1, wherein in the circumferential direction, only every other first interconnection element of the at least three first interconnection elements is surrounded by a respective insulating part.

21. The electric motor according to claim 1, wherein the coil terminals are integrally connected by laser welding to the contacting regions of the at least three first interconnection elements and/or to contacting regions of second interconnection elements and/or to a contacting regions of third interconnection elements, the contacting regions having a V-shaped notch adapted to receive a coil terminal.

22. A method for manufacturing an electric motor as recited in claim 1, comprising:
providing the carrier part, wherein the carrier part is substantially annular and is made of an insulating material and/or an injection molded material;
positioning the at least three first interconnection elements on the carrier part in a circumferential direction, each first interconnection element including two and/or exactly two contacting regions, the first interconnection elements being positioned such that one of the first interconnection elements overlaps, in circumferential and radial directions, an adjacent one of the first interconnection elements, the first interconnection elements being positioned so as to be spaced apart from each other;
joining the at least three first interconnection elements to the carrier part in a form-locked and/or integral manner to form an interconnection unit;
connecting, electrically connecting, and or integrally connecting by laser welding each of the contacting regions of the at least three first interconnection elements to a coil terminal of one of a plurality of coils having two coil terminals and being positioned on a stator of the electric motor to interconnect the coils to form a multiphase winding.

23. The method according to claim 22, wherein in the positioning step, the at least three first interconnection elements are positioned such that in the circumferential direction only every other first interconnection element of the at least three first interconnection elements is surrounded by an insulating part made of an injection molded insulating material, the surrounded, first interconnection element and the surrounding insulating part being joined on two sides in the circumferential direction in a form-locked manner and/or joined on two sides in the axial direction in a form-locked manner and/or joined on one side in the radial direction in a form-locked manner.

24. The method according to claim 22, wherein in the position step, a second interconnection element is positioned on the carrier part, the second interconnection element including three contacting regions, and, in the joining step, the second interconnection element is joined to the carrier part in a form-locked and/or integral manner to form the interconnection unit, and, in the connecting step, each of the contacting regions of the second interconnection element is connected to, electrically connected to, and or integrally connected by laser welding to one of the coil terminals.

25. The method according to claim 22, wherein, in the positioning step, three third interconnection elements are positioned on the carrier part, each third interconnection element having two different contacting regions, in the joining step, the third interconnection elements are joined to the carrier part in a form-locked and/or integral manner to form the interconnection unit, and, in the connecting step, one of the two contacting regions of the third interconnection elements is connected to, electrically connected to, and/or integrally connected by laser welding to one of the coil terminals.

26. The method according to claim 22, wherein in the connecting step, the stator, including the coils and the interconnection unit connected to the coil terminals, is encapsulated by potting compound.

27. The method according to claim 26, wherein contacting regions of third interconnection elements that are not connected to a coil terminal remain free of the potting compound.

28. The electric motor according to claim 12, wherein the second attachment regions of each of the at least three first interconnection elements have a same second radial position and/or a same second axial position.

29. The electric motor according to claim 13, wherein the second attachment regions of each of the at least three first interconnection elements have a same second radial position and/or a same second axial position, the first radial position and the second radial position being different, the first axial position and the second axial position being different.

30. The electric motor according to claim 16, wherein the second interconnection element and all of the at least three first interconnection elements overlap in the radial direction and/or the second interconnection element and two of the at least three first interconnection elements overlap in the circumferential and radial directions.

31. The electric motor according to claim 17, wherein the plurality of interconnection elements include exactly three third interconnection elements.

32. The electric motor according to claim 1, wherein the arcuate connecting region of the first one of the at least three first interconnection elements and the arcuate connecting region of the second one of the at least three first interconnection elements are positioned axially on top of each other.

* * * * *